US011812737B1

(12) United States Patent
Teren

(10) Patent No.: US 11,812,737 B1
(45) Date of Patent: Nov. 14, 2023

(54) WEARABLE PROTECTION DEVICE FOR RESIDENTIAL AND COMMERCIAL TRASH CANS AND METHOD OF USE

(71) Applicant: Darren Mark Teren, Valley Center, CA (US)

(72) Inventor: Darren Mark Teren, Valley Center, CA (US)

( * ) Notice: Subject to any disclaimer, the term of this patent is extended or adjusted under 35 U.S.C. 154(b) by 0 days.

(21) Appl. No.: 17/961,354

(22) Filed: Oct. 6, 2022

Related U.S. Application Data

(63) Continuation-in-part of application No. 17/880,365, filed on Aug. 3, 2022.

(51) Int. Cl.
*A01M 29/34* (2011.01)
*B65F 1/14* (2006.01)

(52) U.S. Cl.
CPC .............. *A01M 29/34* (2013.01); *B65F 1/14* (2013.01)

(58) Field of Classification Search
CPC ............ A01M 1/00; A01M 1/20; A01M 1/24; A01M 29/00; A01M 29/12; A01M 29/30; A01M 29/34; B65F 1/14; B65F 1/1452; B65F 1/1468; B65F 1/00
USPC ............. 43/1, 124, 132.1, 131, 120; 52/101; 116/22 A; 220/730; 2/10, 173, 206; 128/206.14, 206.12, 206.19, 206.21, 128/206.25
See application file for complete search history.

(56) References Cited

U.S. PATENT DOCUMENTS

| | | | | |
|---|---|---|---|---|
| 1,043,774 A * | 11/1912 | Kirkman | ...................... | 220/87.1 |
| 1,082,103 A * | 12/1913 | Welter | ................. | 43/118 |
| 1,085,701 A * | 2/1914 | Richman | ......................... | 43/120 |
| 1,114,191 A * | 10/1914 | Shapiro | ............................ | 43/120 |
| 1,212,660 A * | 1/1917 | Meade | ............................ | 43/120 |
| 1,244,859 A * | 10/1917 | Johnson | .......................... | 43/120 |
| 1,290,760 A * | 1/1919 | Langbein | ......................... | 43/120 |
| 1,321,286 A * | 11/1919 | Connolly | ......................... | 43/120 |
| 1,324,727 A * | 12/1919 | Carlson | ........................... | 43/115 |
| 1,350,402 A * | 8/1920 | Cereghino | ................ | B65F 1/14 43/120 |
| 1,463,659 A * | 7/1923 | Paul | ....................... | A01M 1/106 43/120 |
| 1,467,895 A * | 9/1923 | Dunseth | ................ | A01M 1/106 43/120 |
| 1,505,014 A * | 8/1924 | Duncan | .................. | A01M 1/106 43/120 |
| 1,607,249 A * | 11/1926 | Dyer | ...................... | A01M 1/106 43/120 |
| 1,719,186 A * | 7/1929 | Lowy | ........................ | B65F 7/00 220/87.1 |

(Continued)

FOREIGN PATENT DOCUMENTS

KR 20120030245 A * 3/2012
WO WO-2006088382 A1 * 8/2006 .............. A01M 1/10

*Primary Examiner* — Darren W Ark
(74) *Attorney, Agent, or Firm* — Leavitt Eldredge Law Firm

(57) ABSTRACT

A wearable protection device for providing a barrier against pests, insects, and other debris around the handle of a residential or commercial trash can is disclosed. The device includes a sleeve body, the sleeve body having a first end including a mouth and a second end including a pair of mitten appendages; a mechanical closure for closing the mouth; and a peelable semi-permanent adhesive tape positioned at the base of the pair of mitten appendages.

2 Claims, 6 Drawing Sheets

(56) References Cited

U.S. PATENT DOCUMENTS

| | | | | |
|---|---|---|---|---|
| 1,815,122 A * | 7/1931 | Smith | A01M 1/106 | |
| | | | 43/120 | |
| 2,636,175 A * | 4/1953 | Hoffman, Jr. | A41D 27/136 | |
| | | | 2/323 | |
| 2,721,099 A * | 10/1955 | Rupp | A01M 1/2055 | |
| | | | 239/57 | |
| 2,808,679 A * | 10/1957 | Collins | A01M 1/2011 | |
| | | | 43/131 | |
| 2,921,581 A * | 1/1960 | Swearingen | A62B 18/025 | |
| | | | 128/206.25 | |
| 3,098,703 A * | 7/1963 | Snyder | A01M 1/2055 | |
| | | | 514/723 | |
| 3,303,599 A * | 2/1967 | Ballard | A01M 1/106 | |
| | | | 43/118 | |
| 3,480,176 A * | 11/1969 | Boyd | A01M 29/24 | |
| | | | 220/730 | |
| 3,661,326 A * | 5/1972 | Wilson | A01M 1/2055 | |
| | | | 220/87.1 | |
| 3,664,335 A * | 5/1972 | Boucher | A41D 13/113 | |
| | | | 128/206.19 | |
| 3,779,244 A * | 12/1973 | Weeks, Jr. | A41D 13/1146 | |
| | | | 55/DIG. 35 | |
| RE28,102 E * | 8/1974 | Mayhew | A41D 13/1115 | |
| | | | 128/206.19 | |
| 3,834,384 A * | 9/1974 | Raines | A41D 13/11 | |
| | | | 128/201.15 | |
| 4,100,624 A * | 7/1978 | Davis | A41B 11/14 | |
| | | | 2/409 | |
| 4,105,144 A * | 8/1978 | Lin | A01M 1/2044 | |
| | | | 206/532 | |
| 4,202,472 A * | 5/1980 | Lin | A01M 1/2055 | |
| | | | 206/532 | |
| 4,203,479 A * | 5/1980 | Mathews | B65F 1/00 | |
| | | | 383/117 | |
| 4,643,182 A * | 2/1987 | Klein | B01D 39/2055 | |
| | | | 55/DIG. 35 | |
| 4,797,956 A * | 1/1989 | Boyce | A61F 9/025 | |
| | | | 2/13 | |
| 4,881,671 A * | 11/1989 | Horton | A45C 1/04 | |
| | | | 43/132.1 | |
| 4,941,210 A * | 7/1990 | Konucik | A41D 27/13 | |
| | | | 2/195.3 | |
| 4,944,294 A * | 7/1990 | Borek, Jr. | A62B 18/082 | |
| | | | 128/201.15 | |
| 4,966,140 A * | 10/1990 | Herzberg | A42B 1/045 | |
| | | | 128/206.13 | |
| 5,280,684 A * | 1/1994 | Filonczuk | A01M 1/223 | |
| | | | 43/120 | |
| 5,347,657 A * | 9/1994 | Unsell | A41D 7/005 | |
| | | | 2/400 | |
| 5,359,805 A * | 11/1994 | Kadokura | A01M 29/08 | |
| | | | 43/108 | |
| 5,383,450 A * | 1/1995 | Hubbard | A41D 13/1184 | |
| | | | 2/427 | |
| 5,406,944 A * | 4/1995 | Gazzara | A62B 18/082 | |
| | | | 128/201.12 | |
| 5,446,925 A * | 9/1995 | Baker | A61F 9/02 | |
| | | | 2/9 | |
| 5,561,863 A * | 10/1996 | Carlson, II | A41D 13/1184 | |
| | | | 2/206 | |
| 5,656,368 A * | 8/1997 | Braun | B01D 39/1623 | |
| | | | 210/493.1 | |
| 5,682,879 A * | 11/1997 | Bowers | A62B 18/082 | |
| | | | 128/201.12 | |
| 5,803,075 A * | 9/1998 | Yavitz | A41D 13/1115 | |
| | | | 128/206.28 | |
| 5,813,398 A * | 9/1998 | Baird | A41D 13/1115 | |
| | | | 128/206.13 | |
| 5,819,466 A * | 10/1998 | Aesch | A01M 1/245 | |
| | | | 52/404.2 | |
| 5,850,808 A * | 12/1998 | Burdick | A01M 29/26 | |
| | | | 119/713 | |
| 5,884,426 A * | 3/1999 | Ishida | A01M 29/26 | |
| | | | 116/22 A | |
| 5,884,801 A * | 3/1999 | Simpson | B65F 1/0006 | |
| | | | 220/495.08 | |
| 6,026,511 A * | 2/2000 | Baumann | A61F 9/029 | |
| | | | 2/9 | |
| 6,062,220 A * | 5/2000 | Whitaker | A62B 18/08 | |
| | | | 128/206.19 | |
| 6,062,412 A * | 5/2000 | Jacobsmeyer, Jr. | B65F 1/16 | |
| | | | 220/259.5 | |
| 6,185,740 B1 * | 2/2001 | Zegarelli | A61F 9/045 | |
| | | | 128/857 | |
| 6,477,977 B1 * | 11/2002 | Combes | A01M 29/32 | |
| | | | 114/343 | |
| 6,659,970 B1 * | 12/2003 | Woodworth | A61F 15/006 | |
| | | | 602/42 | |
| 6,694,971 B2 * | 2/2004 | Schroeder | A62B 23/025 | |
| | | | 128/201.14 | |
| 6,828,578 B2 * | 12/2004 | DeMeo | A41D 13/11 | |
| | | | 250/516.1 | |
| 6,886,563 B2 * | 5/2005 | Bostock | A41D 13/1115 | |
| | | | 128/206.19 | |
| 6,978,782 B2 * | 12/2005 | Tayebi | A62B 23/025 | |
| | | | 128/201.17 | |
| 7,077,140 B1 * | 7/2006 | Berke | A41D 13/1176 | |
| | | | 128/206.28 | |
| 7,530,354 B2 * | 5/2009 | Hanlon | A62B 23/06 | |
| | | | 128/206.14 | |
| 7,549,180 B2 * | 6/2009 | Matsumoto | A61F 9/02 | |
| | | | 2/436 | |
| 7,866,679 B1 * | 1/2011 | Leon | B65F 1/1426 | |
| | | | 280/79.5 | |
| 8,110,061 B2 * | 2/2012 | Moore | A62B 23/06 | |
| | | | 128/205.27 | |
| 8,261,375 B1 * | 9/2012 | Reaux | A41D 13/1184 | |
| | | | 128/201.15 | |
| 8,490,324 B2 * | 7/2013 | Highet | B65F 1/1473 | |
| | | | 43/131 | |
| 8,657,139 B1 * | 2/2014 | Bodine | A61L 9/12 | |
| | | | 220/730 | |
| 8,938,812 B1 * | 1/2015 | Gandy | A41D 27/13 | |
| | | | 2/55 | |
| 9,497,954 B1 * | 11/2016 | Veasey, III | A01M 13/003 | |
| 9,504,244 B2 * | 11/2016 | Highet | A01M 25/004 | |
| 9,770,611 B2 * | 9/2017 | Facer | A41D 13/11 | |
| 9,992,992 B1 * | 6/2018 | Edelen | A01M 29/34 | |
| 10,098,336 B2 * | 10/2018 | Darnell | A01M 1/106 | |
| 10,285,395 B1 * | 5/2019 | Ehrenberg | A01M 29/30 | |
| 10,575,514 B1 * | 3/2020 | Sasaki | G02C 7/10 | |
| 10,575,572 B2 * | 3/2020 | Kakinuma | G02B 1/18 | |
| 11,459,172 B2 * | 10/2022 | Martin, II | B65F 1/1646 | |
| 11,518,610 B2 * | 12/2022 | Miller | B65F 1/16 | |
| 11,523,601 B2 * | 12/2022 | Mateer | A01N 25/18 | |
| 11,672,245 B1 * | 6/2023 | Teren | A01M 29/34 | |
| | | | 43/114 | |
| 2003/0136410 A1 * | 7/2003 | Matich | A62B 18/08 | |
| | | | 128/206.25 | |
| 2003/0167550 A1 * | 9/2003 | Andrews | A41D 27/133 | |
| | | | 2/53 | |
| 2003/0186604 A1 * | 10/2003 | Nourigat | A01M 1/04 | |
| | | | 428/114 | |
| 2006/0101707 A1 * | 5/2006 | James | A01M 1/2055 | |
| | | | 43/132.1 | |
| 2006/0242891 A1 * | 11/2006 | Marshall | A01M 29/34 | |
| | | | 43/132.1 | |
| 2007/0067888 A1 * | 3/2007 | Manier | A41D 31/12 | |
| | | | 2/53 | |
| 2007/0295334 A1 * | 12/2007 | Nonomura | D21H 21/36 | |
| | | | 128/206.13 | |
| 2008/0163409 A1 * | 7/2008 | Humiston | A01M 1/14 | |
| | | | 2/410 | |
| 2008/0163541 A1 * | 7/2008 | Harris | B65F 1/16 | |
| | | | 43/131 | |
| 2009/0277451 A1 * | 11/2009 | Weinberg | A41D 13/1176 | |
| | | | 128/206.16 | |

(56) References Cited

U.S. PATENT DOCUMENTS

| | | | | |
|---|---|---|---|---|
| 2010/0236470 A1* | 9/2010 | Doty, III | | A01M 29/06 |
| | | | | 116/22 A |
| 2011/0065359 A1* | 3/2011 | Kenny | | A41C 3/12 |
| | | | | 450/39 |
| 2011/0155137 A1* | 6/2011 | Martin | | A41D 13/1146 |
| | | | | 29/527.1 |
| 2011/0220109 A1* | 9/2011 | Chiu | | A41D 13/1161 |
| | | | | 128/206.19 |
| 2012/0060258 A1* | 3/2012 | Stewart | | B32B 5/022 |
| | | | | 2/206 |
| 2012/0060843 A1* | 3/2012 | Magidson | | A41D 13/1146 |
| | | | | 128/206.19 |
| 2012/0291336 A1* | 11/2012 | Friend | | A01M 1/20 |
| | | | | 43/131 |
| 2013/0255134 A1* | 10/2013 | Robinson | | A01M 1/14 |
| | | | | 43/114 |
| 2014/0069976 A1* | 3/2014 | Osher | | A01K 27/008 |
| | | | | 221/26 |
| 2014/0290122 A1* | 10/2014 | Vasudeva | | A01M 1/103 |
| | | | | 43/58 |
| 2014/0360502 A1* | 12/2014 | Kushida | | A61M 16/0694 |
| | | | | 128/206.25 |
| 2015/0150326 A1* | 6/2015 | Gains | | A41G 7/00 |
| | | | | 2/206 |
| 2015/0335007 A1* | 11/2015 | Donoho | | E04B 1/72 |
| | | | | 52/101 |
| 2016/0029616 A1* | 2/2016 | Johnston | | A01M 29/30 |
| | | | | 43/132.1 |
| 2016/0052714 A1* | 2/2016 | McDade | | B65F 1/1615 |
| | | | | 220/730 |
| 2016/0157441 A1* | 6/2016 | Esler | | A01G 13/0237 |
| | | | | 43/124 |
| 2017/0127662 A1* | 5/2017 | Gajdicar | | A01M 29/14 |
| 2017/0320667 A1* | 11/2017 | Stone | | E05B 63/143 |
| 2019/0075782 A1* | 3/2019 | Pradines | | A01M 1/245 |
| 2020/0107535 A1* | 4/2020 | Hutter | | A01M 1/14 |
| 2020/0240551 A1* | 7/2020 | Escure | | F16L 3/233 |
| 2020/0331696 A1* | 10/2020 | Foster | | B65F 1/1615 |
| 2020/0346853 A1* | 11/2020 | Thompson-Buist | | B65F 1/14 |
| 2021/0137093 A1* | 5/2021 | Gonzales | | A01N 59/00 |
| 2022/0015349 A1* | 1/2022 | Toon, Jr. | | A01M 29/12 |
| 2022/0104478 A1* | 4/2022 | Chang | | A01M 29/34 |
| 2022/0297933 A1* | 9/2022 | Elaywan | | B65F 1/1646 |

\* cited by examiner

WEARABLE PROTECTION DEVICE FOR RESIDENTIAL AND COMMERCIAL TRASH CANS AND METHOD OF USE

CROSS REFERENCE TO RELATED APPLICATIONS

This application is a continuation of U.S. application Ser. No. 17/880,365, filed Aug. 3, 2022, of which is hereby incorporated by reference in its entirety.

BACKGROUND

1. Field of the Invention

The present invention relates generally to trash cans, and more specifically to a wearable protection device that provides a barrier against pests, insects, and other debris on a handle of a residential or commercial trash can.

2. Description of Related Art

Consumers often place their garbage into residential and commercial trash cans for subsequent disposal. For example, FIG. 1 depicts a conventional trash can 101 having a container body 103, a lid 105, and a handle 107. Typically, the handle 107 includes a hand grip portion 109 secured to the body 103 via support members (e.g., support members 111a, 111b). During use, the user can use the handle 107 to maneuver and transport the trash can 101 as needed and desired.

One of the problems commonly associated with the trash can 101 is its proneness of attracting pests and insects. For example, after placing garbage into the container body 103, the garbage often produces an unpleasant atmosphere and thus attracts pests and insects. While the lid 105 provides a barrier to prevent pests and insects from entering the container body 103, the handle 107 is left unprotected. Pests such as spiders often form spider webs around the handle 107, posing significant safety risk.

Accordingly, it is an object of the present invention to provide a wearable protection device that protects prevents pests, insects, and debris from accessing handles of residential and commercial trash cans.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
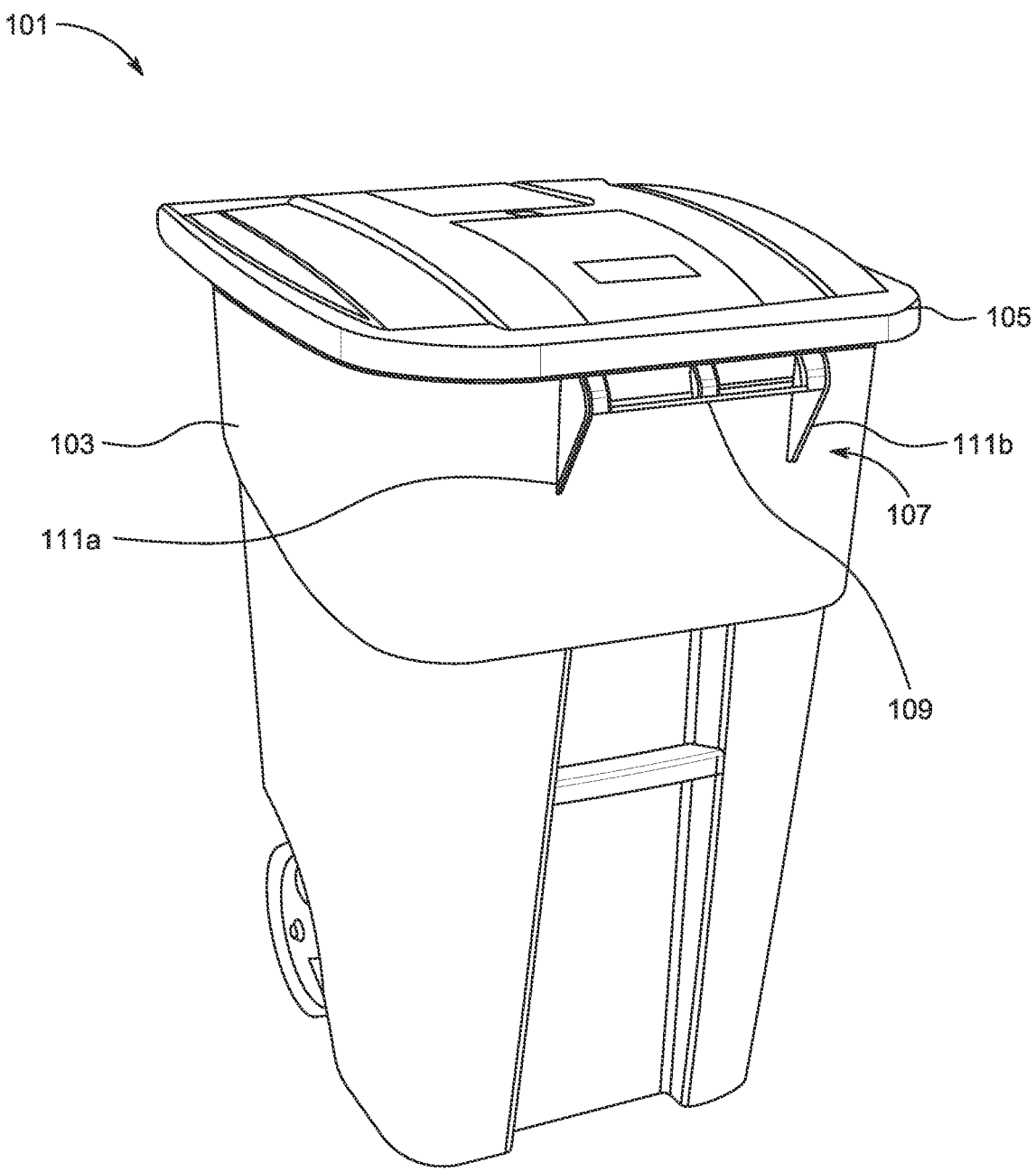
FIG. 1 is a perspective view of a common trash can.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional trash cans. Specifically, the present invention provides for a solution to prevent pests and insects from occupying the handles of residential and commercial trash cans without the use of chemicals or manual cleaning. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
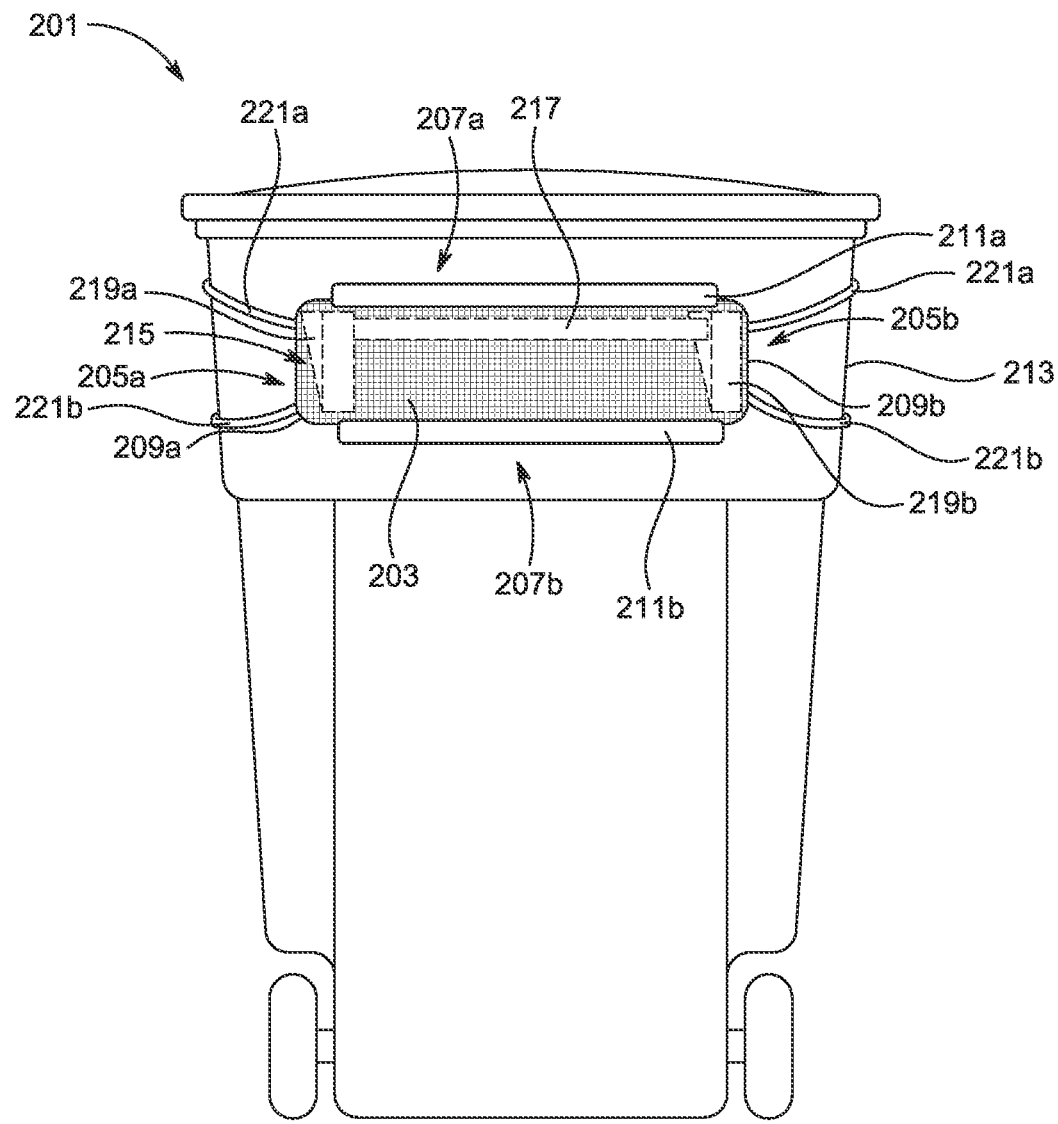
FIG. 2 is a front view of a pest control device in use on a trash can in accordance with one or more embodiments of the present application.

Referring now to the drawings wherein like reference characters identify corresponding or similar elements throughout the several views, FIG. 2 depicts a front view of a pest control device 201 in accordance with one or more embodiments of the present application. It will be appreciated that device 201 overcomes one or more of the above-listed problems commonly associated with conventional residential trash cans.

In the contemplated embodiment, the pest control device 201 includes a generally rectangular shaped flexible body 203 having a first set of opposing ends 205a, 205b and a second set of lateral sides 207a, 207b, wherein each set of opposing ends are generally perpendicular between the other. In the preferred embodiment, the body 203 is constructed of micromesh netting or thin plastic film.

The pest control device 201 also includes a pair of elastic bands 209a, 209b, each of which borders opposing ends 205a, 205b, respectively. The elastic bands 209a, 209b provide for an adjustable friction fit at both ends.

The pest control device 201 further includes a pair of peel-off adhesive tape 211a, 211b, each of which borders opposing ends 207a, 207b. The adhesive tape 211a, 211b provide for a semi-permanent connection point. In the preferred embodiment, the adhesive tape 211a, 211b is waterproof.

During use, the elastic bands 209a, 209b are wrapped over the support members 219a, 219b of a handle 215 of a residential trash can 213, thereby encapsulating the entire handle 215. The adhesive tape 211a, 211b stick to the outer surface of the trash can 213 to seal off the handle 215. It should be appreciated that the adhesive tape 211a, 211b prevent environmental conditions and human interaction from jarring the pest control device 201 out of position from the handle 215. In addition, it should be appreciated that the body 203 is constructed with enough material to allow the handle grip portion 217 to be grasped by the user when maneuvering or transporting the trash can 213.

In some embodiments, the pest control device 201 also includes a pair of tethers 221a, 221b, each tether connecting opposing ends 205a, 205b. The tethers 221a, 221b are configured to wrap around the perimeter of the trash can 213. The tethers 221a, 221b can employ a fastening mechanism (e.g., buckles) or is stretchable so that the pest control device 201 is securely held against the trash can 213.

It should also be appreciated that one of the unique features believed characteristic of the present application is the configuration of features, namely the body, elastic bands, and adhesive tape, that allow for the user seal off the handle of a trash can from pests, insects, and various environmental conditions from accumulating around the handle without the use of chemical pesticides or manual cleaning.

Figure 3:
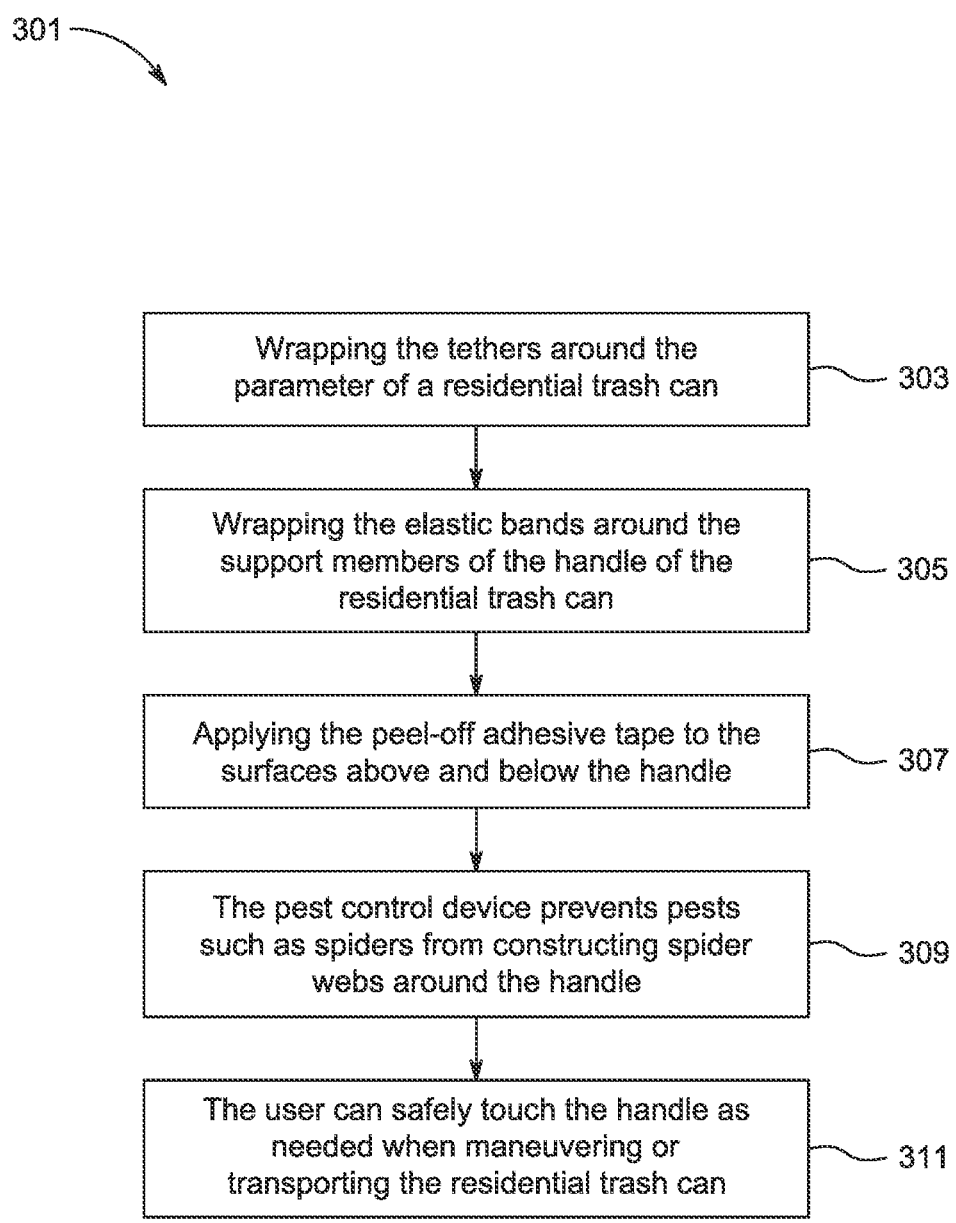
FIG. 3 is a flowchart of a method of use of the pest control devices of the present invention.

In FIG. 3, a flowchart 301 depicts a method of use of the pest control device 201. During use, the user can wrap the tethers around the perimeter of a residential trash can, as shown with box 303. It should be appreciated that the residential trash can may be a commercial trash can. The user can then wrap the elastic bands over the support members of the handle of a residential trash can, as shown with box 305. Next, the user can apply the peel-off the adhesive tape to the surfaces above and below the handle, as shown with box 307. The pest control device prevents pests such as spiders from constructing spider webs around the handle, as shown with box 309. The user can then safely touch the handle as needed when maneuvering or transporting the residential trash can, as shown with box 311.

Figure 4:
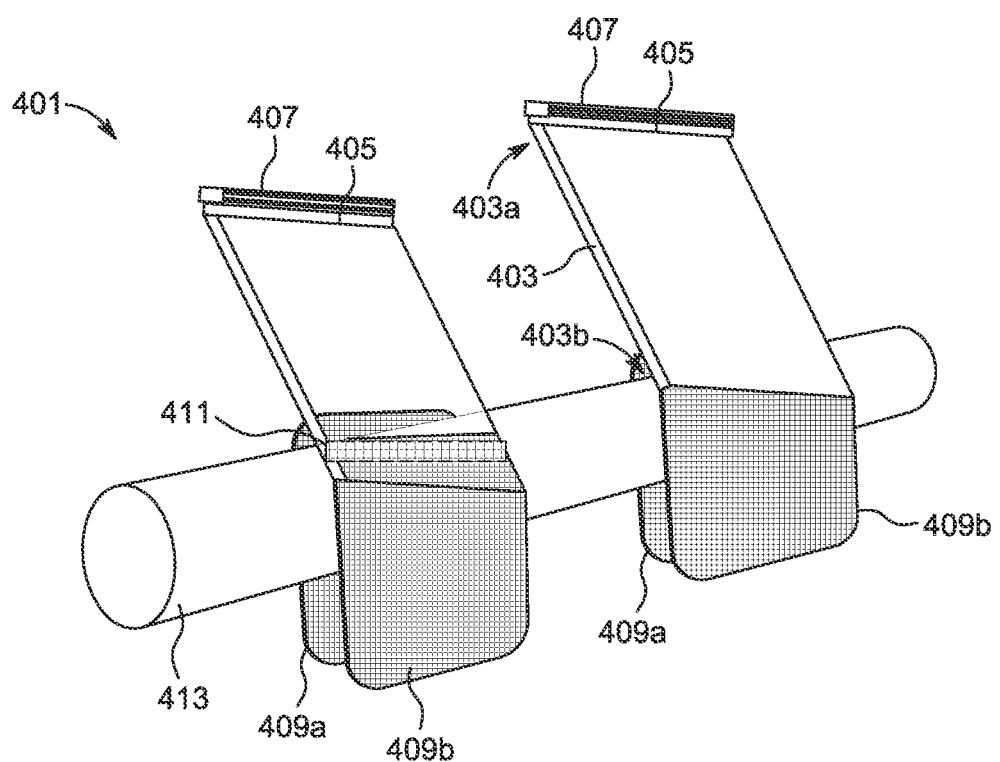
FIG. 4 is a perspective view of a wearable protection device in use on a handle in accordance with one or more embodiments of the present application.

In FIG. 4, a perspective view of a wearable protection device 401 in use is illustrated. It should be understood that a user may employ a second wearable protection device so that the user can protect both of their hands when maneuvering a handle of a trash can.

As shown, the device 401 includes a sleeve body 403 having a first end 403a and a second end 403b. The first end 403a includes a mouth 405 that is closeable via a mechanical closure 407. The second end 403b includes and a pair of mitten appendages 409a, 409b for a user to place their fingers and thumb therein. In some embodiments, the sleeve body 403 can be solid or mesh. In the preferred embodiment, the pair of mitten appendages 409a, 409b is made of mesh netting. The device 401 also includes a peelable semi-permanent adhesive tape 411 positioned at the base of the pair of mitten appendages 409a, 409b.

During use, the semi-permanent adhesive tape 411 is peeled to expose its adhesive side. The user can insert their hand into the sleeve body 403 via the mouth 405 and position their fingers in one mitten appendage and their thumb in the other mitten appendage. The user can then grab a handle 413 while wearing the device 401.

Figure 5:
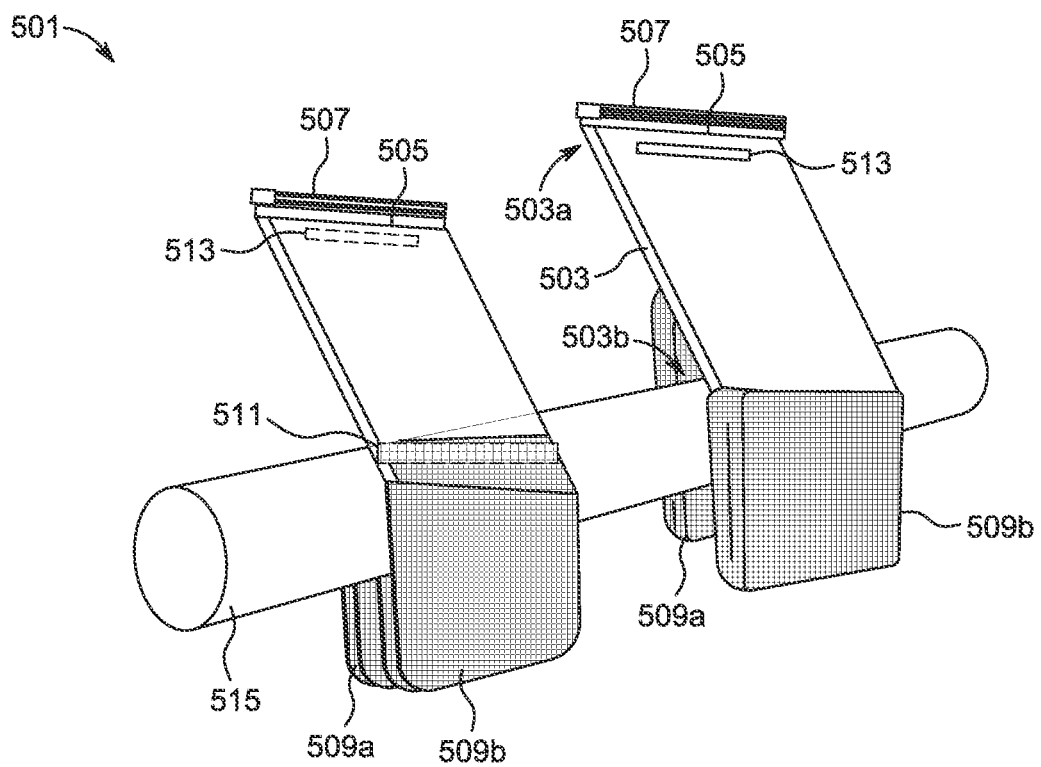
FIG. 5 is a perspective view of an alternative wearable protection device in use on a handle in accordance with one or more embodiments of the present application.

In FIG. 5, a perspective view of an alternative wearable protection device 501 in use is illustrated. It should be understood that a user may employ a second wearable protection device so that the user can protect both of their hands when maneuvering a handle of a trash can.

As shown, the device 501 includes a pleated sleeve body 503 having a first end 503a and a second end 503b. The first end 503a includes a mouth 505 that is closeable via a mechanical closure 507. The second end 503b includes and a pair of mitten appendages 509a, 509b for a user to place their fingers and thumb therein. In some embodiments, the sleeve body 503 can be solid or mesh. In the preferred embodiment, the pair of mitten appendages 509a, 509b is made of pleated mesh pockets. The device 501 also includes a peelable semi-permanent adhesive tape 511 positioned at the base of the pair of mitten appendages 509a, 509b. The device 501 further includes an adjustable, malleable, structural wire tab 513 positioned on a top upper surface of the sleeve body 503. The tab 513 is configured to provide shape and hold open the mouth 505. It should be appreciated that the tab 513 allows the user to insert a hand through the mouth 505 without the need to use their opposite free hand to manually hold open the mouth 505.

During use, the semi-permanent adhesive tape 511 is peeled to expose its adhesive side. The user can insert their hand into the sleeve body 503 via the mouth 505 and position their fingers in one mitten appendage and their thumb in the other mitten appendage. The user can then grab a handle 515 while wearing the device 501.

It should be appreciated that the wearable protection devices 401, 501 is shaped to be universal to both hands in any plane.

In addition, it should be appreciated that the wearable protection devices 401, 501 may be made from any suitable or desired materials. For example, the wearable protection devices 401, 501 may be coated with anti-microbial materials to provide further protection for the user. In another example, the wearable protection devices 401, 501 may comprise of printed, coated paper that can be used for commercial print advertising placements.

It should also be appreciated that one of the unique features believed characteristic of the present application is the inclusion of the mechanical closure for the mouth of the sleeve body which prevents contamination and unwanted access from entering therein. In addition, the adhesive tape keeps the wearable protection device attached to a handle and remain in service at-all-times or until removal of the device is desired.

Figure 6:
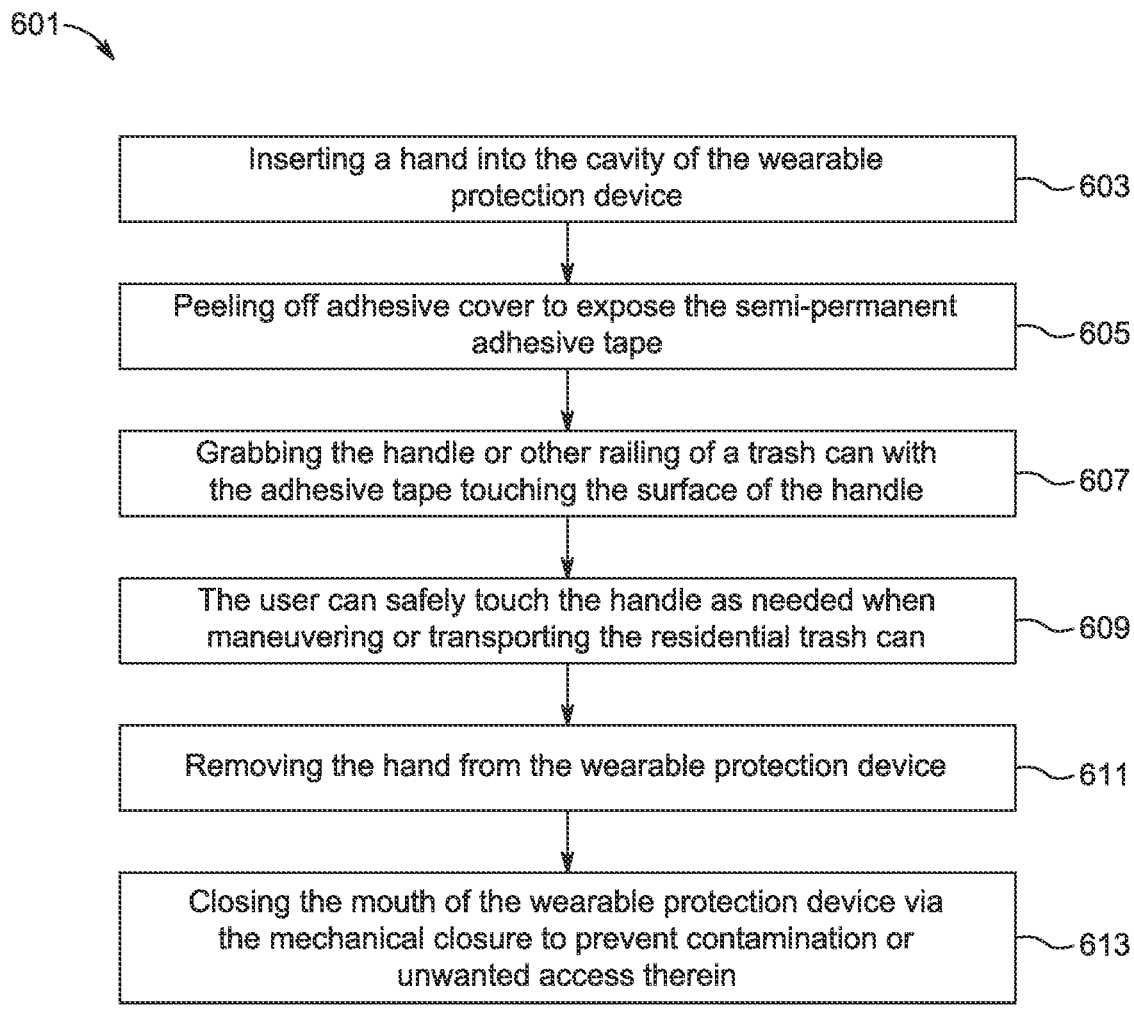
FIG. 6 is a flowchart of a method of use of the wearable protection devices of the present invention.

In FIG. 6, a flowchart 601 depicts a method of use of the wearable protection devices of the present invention. During use, the user can insert their hand into the cavity of the wearable protection device, as shown with box 603. The user can then peel off the adhesive cover to expose the semi-permanent adhesive tape, as shown with box 605. Next, the user can grab the handle or other railing of a trash can with the adhesive tape touching the surface of the handle, as shown with box 607. The user can then safely touch the handle as needed when maneuvering or transporting the residential trash can, as shown with box 609. After removing their hand from the wearable protection device, the user can close the mouth of the wearable protection device via the mechanical closure to prevent contamination or unwanted access therein, as shown with boxes 611, 613.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. In a trash can having a container body and a handle secured to the container body, a wearable protection device attachable to the trash can, the wearable protection device comprising:
   a generally rectangular shaped, flexible body, the body having:
   two longitudinally opposing ends; and
   two laterally opposing ends;
   a pair of elastic bands, each elastic band coupled to a respective end of the two longitudinally opposing ends;
   a pair of peel-off adhesive tapes, each adhesive tape coupled to a respective end of the two laterally opposing ends; and
   a pair of tethers, each tether connecting the two longitudinally opposing ends to each other;
   wherein the elastic bands wrap around the handle of the trash can;
   wherein the peel-off adhesive tapes are applied to surfaces of the container body of the trash can which are above and below the handle of the trash can, creating a semi-permanent seal around the handle; and
   wherein the tethers wrap around a perimeter of the container body of the trash can.

2. The trash can of claim 1, wherein the generally rectangular shaped body is constructed of solid or mesh material.

\* \* \* \* \*